United States Patent [19]
Osborne

[11] 4,439,559
[45] Mar. 27, 1984

[54] MOULDING COMPOSITIONS
[75] Inventor: Trevor R. Osborne, Wellingborough, England
[73] Assignee: Scott Bader Company Limited, Northamptonshire, England
[21] Appl. No.: 422,144
[22] Filed: Sep. 23, 1982
[30] Foreign Application Priority Data
 Sep. 25, 1981 [GB] United Kingdom ............... 8129029
[51] Int. Cl.³ ............................................. C08L 67/06
[52] U.S. Cl. ..................................... 523/513; 523/500
[58] Field of Search .......................... 523/513; 525/36
[56] References Cited
U.S. PATENT DOCUMENTS

| 3,631,224 | 12/1971 | Baum ................................. | 525/36 |
| 3,632,667 | 1/1972 | Baum ................................. | 525/36 |
| 3,652,489 | 3/1972 | Crowe et al. ....................... | 523/513 |
| 3,692,736 | 9/1972 | Besnard et al. .................... | 523/513 |
| 4,077,939 | 3/1978 | Paparatto et al. ................. | 524/322 |

FOREIGN PATENT DOCUMENTS 1469895 12/1968 Fed. Rep. of Germany .
2329712 10/1976 France .
 823755 11/1959 United Kingdom .
 993378 5/1965 United Kingdom .
1318517 5/1973 United Kingdom .
1319243 6/1973 United Kingdom .
2044282 10/1980 United Kingdom .

OTHER PUBLICATIONS

Chemical Abstracts (1975) 82, 30, No. 73872p.
Chemical Abstracts (1975) 82, 47, No. 157329e.

Primary Examiner—Lewis T. Jacobs
Attorney, Agent, or Firm—Cushman, Darby & Cushman

[57] ABSTRACT

A polyester moulding composition for providing a moulded article less susceptible to cracking than those made from conventional polyester moulding compositions contains an unsaturated polyester resin, 25–55 mole % of the acid of which is a symmetrical aromatic saturated dicarboxylic acid and the glycol of which is preferably 1,6 - hexanediol, a monomer which is a solid or liquid of low volatility, at least one inorganic filler and reinforcing fibres. The filler preferably has a mean particle size of below $5\mu$ or from 15 to $130\mu$ inclusive.

9 Claims, No Drawings

MOULDING COMPOSITIONS

FIELD OF THE INVENTION

This invention relates to moulding compositions and in particular to granular compositions containing polyester resins suitable for moulding, especially injection moulding.

BACKGROUND OF THE INVENTION

Conventional polyester moulding compositions suitable for injection moulding consist of three main components: unsaturated polyester resin, filler and reinforcement. Many types have been disclosed over the years originally in the form of doughs but more recently in the form of solid granules, e.g. cylindrical pellets.

The granular materials are often based on crystalline unsaturated polyester resins, monomers, free radical catalysts, fillers and reinforcements. Other additives may be present such as internal release agents, thermoplastics go reduce shrinkage and pigments to obtain the desired colour.

The unsaturated polyesters used in these conventional resins are those based on symmetrical glycols such as ethylene glycol, neopentyl glycol, 1,4-cyclohexane dimethanol, 1,4-bishydroxy methyl benzene, 1,4-bishydroxyethoxy benzene. As the unsaturated component fumaric acid is preferred and modifying saturated dicarboxylic acids such as isophthalic and adipic acids may be incorporated. The preparation of such resins is described in British Pat. Nos. 1,318,517 and 1,319,243. British Pat. No. 1,318,517 also mentions the use of terephthalic acid as a modifying acid but no specific composition containing a polyester having this acid component is disclosed.

The monomers of these compositions can be styrene, α-methyl styrene, chlorostyrene, vinyl toluene, diallyl phthalate, dibutyl fumarate, methyl acrylate or methacrylate or divinyl benzene.

However a defect which is frequently encountered when moulding these compositions is the cracking of the mouldings produced which is believed to be due to shrinkage which the abovementioned addition of thermoplastics additives does not overcome. We found also that variation of the thermoplastics additives was ineffective in preventing cracking.

SUMMARY OF THE INVENTION

Surprisingly, we have now found that by synthesing a resin which may be obtained in highly crystalline form and incorporating this in a granular moulding composition, cracking of mouldings is minimized whilst retaining the non-caking of the compositions on storage and good mechanical properties of articles moulded from the compositions.

The granular moulding composition contains (a) an unsaturated polyester resin, 25-55, preferably 30-50, mole % of the acid of which is a symmetrical aromatic dicarboxylic acid, (b) a monomer which is a solid or a liquid of low volatility, (c) at least one inorganic filler preferably of a mean particle size within specific ranges given below and (d) reinforcing fibres.

A particularly preferred glycol of the polyester resin is 1,6-hexanediol.

The use of a symmetrical aromatic dicarboxylic acid in preparing the resin enables the resin to assume a highly crystalline form and it is believed that this significantly reduces the tendency for moulded articles prepared from compositions in accordance with the invention to crack. The symmetrical aromatic dicarboxylic acid is preferably terephthalic acid although other acids such as 4,4-dicarboxydiphenyl may be used.

Below about 25 mole % of saturated acid in the acid component of the resin the cracking becomes unacceptable and above 55 mole % the qualities of the resin become unacceptable in crystallinity.

The unsaturation of the polyester resin is preferably provided by using fumaric acid as the remaining acid component, though, e.g. maleic or itaconic acid may, less desirably, be employed.

Excellent results from the point of view of obtaining free flowing pellets with good storage stability are obtained by using, as the monomer, a liquid of low volatility, preferably having a vapour pressure below 1 mm Hg at 20° C., e.g. diallyl phthalate or diallyl isophthalate or a solid such as methylene bis acrylamide, 1,6-hexanediol fumarate or triallyl cyanurate. Styrene and similar volatile monomers can be lost on storage.

Many fillers can be employed such as natural or precipitated calcium carbonate, silica, china clay, dolomite, talc, barytes and alumina hydrate. The filler is preferably present in an amount of 60-70% by weight of the total weight of the composition.

We have found, surprisingly, that fillers with a mean particle size principally of below $5\mu$ (i.e. $5 \times 10^{-6}$ meters) or a mean particle size principally above $15\mu$ but not exceeding $130\mu$ give minimal cracking. Similar effects are given by mixtures of such fillers but fillers of mean particle size $5-15\mu$ often lead to cracked mouldings. Particularly preferred particle size ranges are $0.5-4\mu$ and $20-130\mu$.

The reinforcement is usually in the form of short glass fibres but these can be substituted wholly or in part by carbon fibres, synthetic organic fibres or natural fibres such as jute or cotton linters (see our copending British Application 82.22103).

A free radical catalyst is included when formulating the granules of the moulding composition and this free radical catalyst can be selected from organic peroxides according to the cure temperature required bearing in mind the temperatures encountered in the manufacturing process. Dicumyl peroxide is preferred.

Thermoplastic additives may optionally be added and, if used, can be selected from polyethylene, polystyrene, acrylic copolymers, polycaprolactone and saturated polyesters.

Other materials which may be incorporated are internal release agents such as zinc stearate and pigments to obtain the desired colour.

DESCRIPTION OF PREFERRED EMBODIMENTS

Granular moulding compositions embodying the invention, their preparation and their use in forming moulded articles will now be described in more detail with reference to the following Examples, in which the composition containing Polyester A is outside the invention and is given for comparative purposes.

Resin A-D 1,6-Hexanediol, fumaric acid and terephthalic acid were reacted under typical polyesterification conditions to an acid value below 30 mg KOH/g and to a melt viscosity of 25-30 poise as measured on an I.C.I. cone and plate viscometer at 125° C.

The constitution of the polyesters is given in Table I

TABLE I

| Polyester | 1,6-hexanediol | fumaric acid | terephthalic acid |
|---|---|---|---|
| A | 10.3 moles | 10 moles | 0 |
| B | 10.3 moles | 7.5 moles | 2.5 moles |
| C | 10.3 moles | 7.0 moles | 3.0 moles |
| D | 10.3 moles | 6.0 moles | 4.0 moles |

Examples I–IV

Granular moulding compositions were made according to the following formulation (all parts by weight).

| | |
|---|---|
| Polyester (A to D) | 199.32 |
| Methylene bis acrylamide | 22.00 |
| Microdol ® Extra (dolomite filler average particle size 2.6μ) | 329.44 |
| Apyral 2 (alumina hydrate average particle size 20–25μ) | 329.44 |
| Zinc Stearate | 16.50 |
| Dicumyl Peroxide | 3.30 |
| Milled Glass Fibres XG 1691 | 100.00 |
| Turner Bros Asbestos | |

There were mixed in a powder mixer and then passed over a 2 roll mill operating at 100° C. until homogeneous. The compounds were cooled and broken into granules about 3 mm across.

All the samples were compression moulded for 6 minutes at 170° C. and 1500 p.s.i. to give flat plates with the properties shown in Table II.

TABLE II

| Example | I | II | III | IV |
|---|---|---|---|---|
| Polyester | A | B | C | D |
| Cracking | very bad | 2 out of 3 cracked | None | None |
| Tensile Strength MPa | — | 22.6 | 22.6 | 22.4 |
| Tensile Modulus GPa | — | 9.0 | 7.7 | 8.3 |
| Elongation % | — | 0.28 | 0.36 | 0.38 |
| Flexural Strength MPa | — | 53.4 | 56.8 | 52.7 |
| Unnotched Charpy Impact kJ/m$^2$ | — | 3.45 | 3.48 | 3.27 |
| Notched Izod Impact J/m | — | 15.8 | 13.9 | 16.3 |

Polyester resin A contained no terephthalic acid and the composition of Example I is outside the present invention. As can be seen from Table 1 this composition provided moulded articles which showed severe signs of cracking.

Polyester resin B contained 25 mole % of the acid component of terephthalic acid and the composition of Example II is a less preferred composition embodying the invention. Although one of the articles moulded therefrom showed no signs of cracking, the other two did show such signs.

Polyester resins C and D contained 30 and 40 mole % respectively of the acid component of terephthalic acid and the compositions of Examples III and IV are preferred compositions embodying the invention.

EXAMPLE V (Best Method)

1,6-hexanediol fumarate was made by reacting 1,6-hexanediol and fumaric acid in 1.1:1.0 molar ratio at 200° C. to an acid value of 12 mg KOH/g and a viscosity of 5 poises at 125° C. as measured on an I.C.I. cone and plate viscometer. This crystalline product was used as the monomer in an injection moulding compound as shown below.

| | |
|---|---|
| Polyester C | 175.46 |
| 1,6-hexanediol fumarate | 45.86 |
| Microdol ® Extra (dolomite filler) (mean particle size 2.6μ) | 329.44 |
| Apyral 2 (alumina hydrate) (mean particle size 20–25μ) | 329.44 |
| Zinc Stearate | 16.50 |
| Dicumyl Peroxide | 3.30 |
| 3 mm Chopped Glass Fibre ECO 915 | 100.00 |
| Turner Bros Asbestos | |

The components were mixed in a powder mixer and passed through a Werner and Pfleiderer twin screw extruder at 80° C. and diced into pellets.

When moulded as Examples I–IV the flat plate mouldings showed no signs of cracking and had the following properties:

| | |
|---|---|
| Tensile Strength | 23.4 MPa |
| Tensile Modulus | 7.2 MPa |
| Elongation | 0.51% |
| Flexural Strength | 65.9 MPa |
| Unnotched Charpy | 7.2 kJ/m$^2$ |
| Notched Izod | 45.4 J/m |

Examples VI–VII

These examples were compounded as Examples 1–IV using the formulations given below:

| | VI | VII |
|---|---|---|
| Polyester C | 199.32 | 199.32 |
| Methylene bis acrylamide | 22.00 | 22.00 |
| Omya Durcal 2 (whiting filler mean particle size 3μ) | 655.88 | — |
| Britomya Violet Label (whiting filler mean particle size 2.5μ) | — | 655.88 |
| Zinc Stearate | 16.50 | 16.50 |
| Dicumyl Peroxide | 3.30 | 3.30 |
| Milled Glass Fibre XG 1691 | 100.00 | 100.00 |

When moulded as in Examples I–IV the flat plate mouldings showed no signs of cracking and had the following properties:

| Example | VI | VII |
|---|---|---|
| Cracking | none | none |
| Tensile Strength (MPa) | 23.1 | 23.8 |
| Tensile Modulus (GPa) | 11.0 | 10.0 |
| Elongation (%) | 0.24 | 0.32 |
| Flexural Strength (MPa) | 59.7 | 45.0 |
| Unnotched Charpy Impact (kJ/m$^2$) | 4.04 | 3.60 |
| Notched Izod Impact (J/m) | 17.6 | 21.0 |

Examples VIII–IX

The formulations given in Examples III and V were used to make moulding granules which were then injection moulded in a Butler Smith 100/60 machine with a 45 mm thermoset barrel at barrel temperature of 70° C. and a mould temperature of 170° C. at a cycle time of 80 seconds. The moulded ASTM tensile bars were then tested with the following results:

| Example | VIII | IX |
| --- | --- | --- |
| Tensile Strength (MPa) | 38.2 | 31.8 |
| Tensile Modulus (GPa) | 7.4 | 6.0 |
| Elongation (%) | 1.3 | 1.1 |
| Flexural Strength (MPa) | 72.2 | 65.4 |
| Notched Izod Impact (J/m) | 26.8 | 35.3 |

EXAMPLE X

The formulation of Example III was followed and the following fillers or mixtures of fillers were examined and their behaviour on moulding examined.

| Fillers giving mouldings with no cracks | Mean Particle Size ($\mu$) | Particle Size Range ($\mu$) |
| --- | --- | --- |
| Omyalite 95T (whiting) | 1 | <0.5–5 |
| Omyalite 90T (whiting) | 1 | <0.5–5 |
| Hydrocarb (calcite) | 1.5 | <0.5–7 |
| Britomya M (whiting) | 2 | <0.5–15 |
| Britomya BSH (whiting) | 2 | <0.5–15 |
| Britomya Violet label (whiting) | 2.5 | <0.5–20 |
| Microdol Extra (dolomite) | 2.6 | |
| Millicarb (calcite) | 3 | <0.5–10 |
| Omya Durcal 2 (calcite) | 3 | <0.5–10 |
| Omya Durcal 15 (calcite) | 15* | <0.5–100 |
| Apyral 2 (alumina hydrate) | | <20–25 |
| Omya Durcal 130 (calcite) | 130 | |
| 50/50 Microdol Extra/Apyral 2 | | |

| Fillers giving mouldings which cracked | Mean Particle Size $\mu$ | Particle Size Range $\mu$ |
| --- | --- | --- |
| Omya BLH (calcite) | 5 | <0.5–20 |
| Omya BLR2 (calcite) | 5 | <0.5–20 |
| Omya BLR3 (calcite) | 5 | <0.5–20 |
| Omya Durcal 5 (calcite) | 5 | <0.5–25 |
| Microdol 1 (dolomite) | 8 | |
| Calibrite (calcite) | 15* | 5–160 |

Hence, whether one or more fillers are incorporated within a composition embodying the invention and whether or not the mean particle size of the filler particles falls within the preferred limits, a large proportion of the filler particles should have a size within the range principally of from <0.5 to $5\mu$ or $15$–$130\mu$.

For fillers having a maximum particle size of $50\mu$ or less the particle size distribution is determined using a Sedigraph, while for coarser fillers, the wet sieve method is employed. Where a filler contains a mixture of fine and coarse particles the fine and coarse particle size distributions are determined by the Sedigraph and the wet sieve methods respectively. Both methods provide a graph from which mean particle size can be calculated.

What is claimed is:

1. A granular composition for moulding, which composition contains
   (a) an unsaturated polyester resin, 25–55 mole % of the acid component of which is a symmetrical aromatic saturated dicarboxylic acid and the glycol component of which is 1,6-hexanediol,
   (b) a monomer which is selected from monomers which are solids and liquids of low volatility,
   (c) at least one inorganic filler, and
   (d) reinforcing fibres.

2. A composition according to claim 1, wherein the remaining acid is fumaric acid.

3. A composition according to claim 1, wherein 30–50 mole % of the acid is a said symmetrical aromatic saturated dicarboxylic acid.

4. A composition according to claim 1, wherein the symmetrical aromatic dicarboxylic acid is selected from terephthalic acid and 4,4-dicarboxydiphenyl.

5. A composition according to claim 1, wherein the said at least one filler has a mean particle size selected from the ranges of below $5\mu$ and from 15 to $130\mu$ inclusive.

6. A composition according to claim 1, wherein the amount of filler is from 60–70% by weight of the total weight of the composition.

7. A composition according to claim 1, wherein the monomer is a liquid of low volatility.

8. A composition according to claim 7, wherein the monomer is selected from the group consisting of diallyl phthalate and methylene bis acrylamide.

9. A composition according to claim 1, which additionally contains dicumyl peroxide as a free radical catalyst.

* * * * *